United States Patent [19]

Pusic et al.

[11] Patent Number: 4,506,323
[45] Date of Patent: Mar. 19, 1985

[54] CACHE/DISK FILE STATUS INDICATOR WITH DATA PROTECTION FEATURE

[75] Inventors: Vladi Pusic, San Jose; Benjamin T. George, Sunnyvale, both of Calif.; Monte E. Smith, St. Paul; Craig B. Johnson, Shoreview, both of Minn.

[73] Assignee: Sperry Corporation, New York, N.Y.

[21] Appl. No.: 354,329

[22] Filed: Mar. 3, 1982

[51] Int. Cl.³ .............................................. G06F 1/00
[52] U.S. Cl. ................................................... 364/200
[58] Field of Search ... 364/200 MS File, 900 MS File; 371/66

[56] References Cited

U.S. PATENT DOCUMENTS

| 3,286,239 | 11/1966 | Thompson et al. | 371/66 |
| 3,755,785 | 8/1973 | Kirk | 364/200 |
| 4,060,849 | 11/1977 | Bienvenu et al. | 364/200 |
| 4,062,059 | 12/1977 | Suzuki | 364/200 |
| 4,264,954 | 4/1981 | Briggs et al. | 364/200 |
| 4,337,524 | 6/1982 | Parkinson | 371/66 |

Primary Examiner—Raulfe B. Zache
Assistant Examiner—David Y. Eng
Attorney, Agent, or Firm—Griffin, Branigan & Butler

[57] ABSTRACT

A data processing system has a host processor, a RAM, a cache memory for storing segments of data, a plurality of disk drive devices and a storage control unit for controlling data transfers, data from the host processor being written to the cache memory and subsequently destaged to the disks. The storage control unit continuously updates a variable indicating the number of written-to segments resident in the cache memory that have not been destaged to the disks. The variable is stored in the RAM. A File Status flipflop is responsive to the variable to produce a "good file" signal when the variable is zero. The File Status flipflop is provided with an auxiliary power supply to maintain it in its present state in the event all power to the cache memory is terminated. Upon restoration of power after a complete power loss, the output of the status flipflop may be sampled by a command from the host processor to find out if any data was lost because written-to segments were present in the cache memory at the time all power was lost. The output of the File Status flipflop is also utilized to inhibit manually actuated functions which would destroy or invalidate written-to segments in the cache memory if the power to the cache memory were turned off, the cache memory were taken off line, or the port select switches between cache memory and the storage control unit were actuated to change port connections.

10 Claims, 3 Drawing Figures

CACHE/DISK FILE STATUS INDICATOR WITH DATA PROTECTION FEATURE

RELATED APPLICATIONS

This application is related to the copending application of Robert E. Swenson entitled CACHE/DISK SUBSYSTEM, U.S. Pat. Ser. No. 207,152 filed Nov. 14, 1980 now U.S. Pat. No. 4,394,733, and the application of Robert E. Swenson et al. entitled CACHE/-DISK SYSTEM WITH WRITEBACK SYNCHRONIZATION, U.S. Pat. Ser. No. 354,556 filed concurrently herewith.

BACKGROUND OF THE INVENTION

The above-mentioned applications disclose a data processing system for decreasing the average time required to access data where that data is stored on disks. A cache memory is provided and data in this memory may be accessed in a much shorter time than if the data were accessed directly from the disks. The cache memory stores segments of data, these segments containing the most recently accessed words or the words most likely to be accessed by a host processor within a short interval. When the host processor wishes to access a word or words on a disk it sends a read or a write command to a storage control unit which first checks to see if the segment or segments containing the desired word or words is/are resident in the cache memory. If the word or words are in segments resident in the cache memory the word or words are returned from the cache memory to the host through the storage control unit if the host has issued a read command. If the host has issued a write command then the word or words are written to in the cache memory. Later, the written-to segments are destaged to the disks to update the disks which provide a more permanent storage for a data file.

In the foregoing system, the cache memory uses MOSFET devices and is subject to loss of the segments of data therein should all power to the cache memory be lost. An uninterruptable power supply, capable of maintaining data in the cache memory for a short interval after loss of the main AC power supply, is provided to preserve the integrity of data in the cache memory during AC power outages of short duration. However, it is impractical to provide a standby power source capable of powering the cache memory for more than a few minutes. Thus, when a power outage lasts for a considerable length of time the data in the cache memory at the time all power is lost is itself lost. This creates a problem in that some of the segments which have been written to while in the cache memory may not have been destaged to the disks hence the system has no valid copy of the data which was in these segments.

The concurrently filed application referred to above discloses and claims a method and apparatus for determining the oldest written-to segment resident in the cache memory at the time of an AC power loss, and sending this information to a host processor in response to a read command from the host processor. However, the RAM storage means which enables this information to be provided is itself powered by the uninterruptable power source and becomes incapable of functioning within a few minutes after loss of the AC power.

In accordance with the present invention means are provided for storing for a period of several days an indication of whether or not the cache memory contained any written-to segments at the time of all power loss whereby, upon restoration of the AC power the host processor may interrogate the indication storage means to determine if the data file, i.e. the data on the disks is completely correct, or whether it is incorrect because written-to segments were resident in the cache memory at the time of complete power loss.

BRIEF SUMMARY OF THE INVENTION

An object of the present invention is to provide a novel means for storing, during periods of power outage, an indication as to the integrity of a data file.

An object of the present invention is to provide an indicator means responsive to a count of the number of written-to segments in a cache memory for indicating if there is at least one written-to segment in the cache memory at the time of a loss of power to the cache memory, and means providing standby power to the indicator means so that it may maintain its indication over an extended interval of time.

An object of the present invention is to provide an improvement in a system having a host processor, a cache memory for storing segments of data most likely to be used, a random access memory, a bulk memory, and a storage control unit for controlling the transfer of data between the host processor, the cache memory and the bulk memory, the storage control unit including means for developing a count of the number of written-to segments in said cache memory that have been written to but not destaged from the cache memory to the bulk memory since being written to and storing said count in a predetermined location in the random access memory, the improvement comprising: a file status indicator having two states; means for sensing the count; means, responsive to the sensing means, for selectively setting the file status indicator when the count is zero and clearing it when the count is not zero; and, a standby power supply for maintaining the state of the file status indicator for an extended interval of time subsequent to the loss of power to the cache memory.

An object of the present invention is to provide an improvement as set forth above wherein the file status indicator is a flipflop producing a file status output signal when it is set, the improvement further comprising means, responsive to a given command from the host processor, for reading the file status signal and transferring it to the host processor.

Another object of the invention is to provide an improvement as set forth above and further comprising: a further flipflop; means for clearing the further flipflop when power to the cache memory is raised to its operating level; means responsive to a second given command from the host processor for setting the further flipflop, the further flipflop producing an output signal when it is set; means for applying the output signal from the further flipflop as an enabling signal to enable the means for selectively setting and resetting the File Status flipflop; and logic means for logically combining the output signals from the flipflops and producing a file status signal indicating the status of information in the cache memory; the means for reading the file status signal from the File Status flipflop comprising means for reading the file status signal produced by the logic means.

A further object of the present invention is to provide means for generating a file status signal as set forth above and further comprising means responsive to the file status signal produced by the logic means for preventing the cache memory from being taken off line when the file status signal indicates that written-to segments are present in the cache memory.

Still another object of the invention is to provide means for generating a file status signal as set forth above and further comprising means responsive to the file status signal produced by the logic means for preventing removal of power from the cache memory when the file status signal indicates that written-to segments are present in the cache memory.

Another object of the invention is to provide means for generating a file status signal as set forth above for use in a system that includes plural storage control units and the cache memory has plural ports with means for electronically switching the ports between storage control units, the file status signal produced by said logic means being used to inhibit the switching means so that the ports may not be switched when the file status signal indicates that written-to segments are present in the cache memory.

Other objects of the invention and its mode of operation will become apparent upon consideration of the following description and the accompanying drawings.

DETAILED DESCRIPTION OF THE INVENTION

Figure 1:
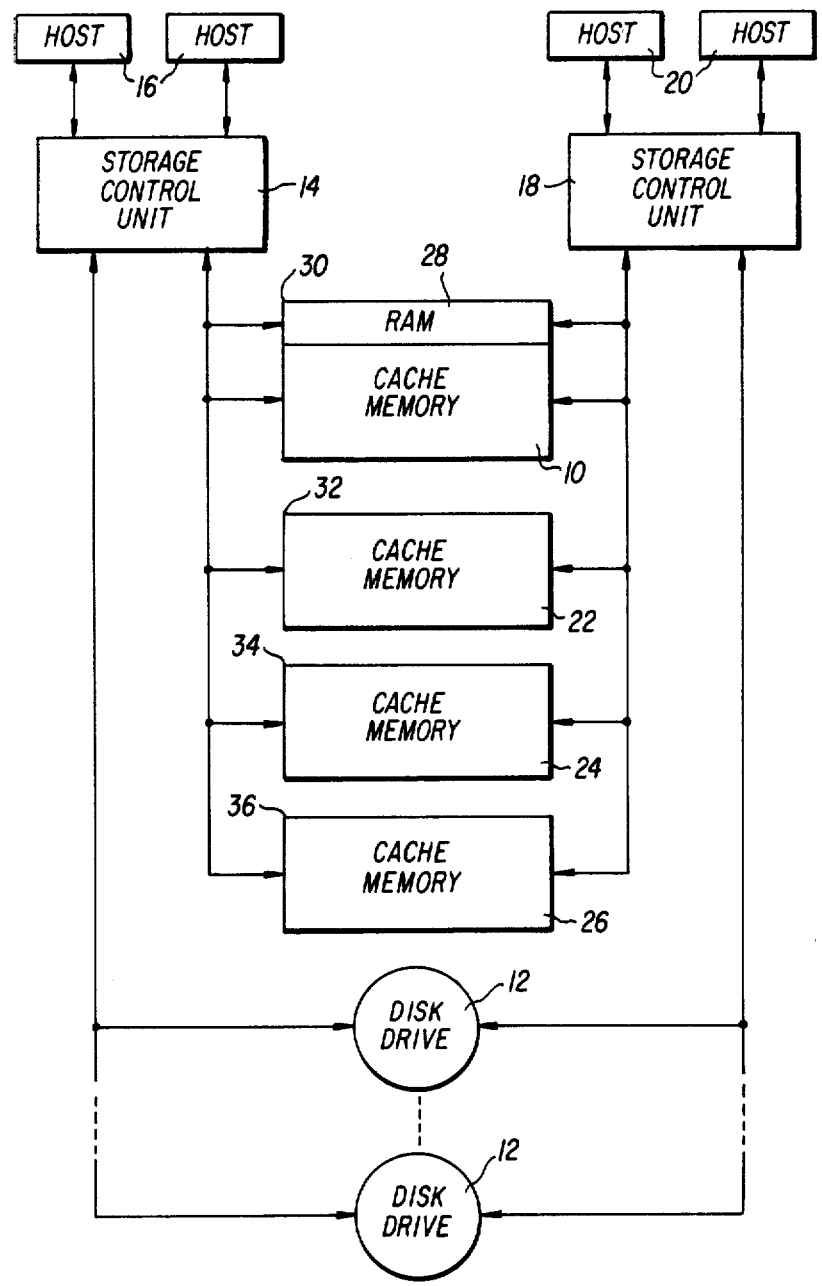
FIG. 1 shows a cache/disk system employing a plurality of host processors, a plurality of storage control units, a cache memory disposed in plural cache memory cabinets, and a plurality of disk drive devices.

FIG. 1 illustrates a cache/disk system of the type disclosed in the above-referenced copending application of Robert E. Swenson, U.S. Pat. Ser. No. 207,152 filed Nov. 14, 1980. A minimum system configuration comprises a cache memory 10, one or more disk drive devices 12, a storage control unit 14, and one or more host processors 16. The system may be expanded to include a second storage control unit 18 having a second plurality of host processors 20 connected thereto. The cache memory may be extended by adding additional cache memory units 22, 24 and 26 to provide a maximum cache memory capacity of 64 megabytes in four cabinets 30, 32, 34 and 36.

The cache memory (comprising cache memory portions 10, 22, 24 and 26) stores segments of data most likely to be used by the host processors 16 and 20. When a host processor 16 wishes to access data at one of the disk drives 12, it sends a command to the storage control unit 14. The storage control unit 14 determines whether or not the required data is resident in the cache memory. If it is, it is either modified or transferred through the storage control unit to the host processor depending upon whether the host processor has issued a read or a write command.

If a host processor issues a write command and this command modifies the data in a segment in the cache memory, this segment must subsequently be destaged to the disk drive at the address specified in the host write command. When data is destaged to a disk drive device, it is transferred from the cache memory to the storage control unit 14 and then to one of the disk drive devices 12.

A similar arrangement is provided with respect to storage control unit 18 and host processors 20. Since the storage control units 14 and 18 operate independently, some means must be provided for storing global variables so that they are available to both of the storage control units. This is accomplished by providing a random access memory (RAM) 28 located in the cabinet with one portion of the cache memory. As shown in FIG. 1, RAM 28 is physically located in the same cabinet 30 as the cache memory portion 10. Cabinets 32, 34 and 36 containing those portions 22, 24 and 26 of the cache memory do not include a RAM.

Figure 2:
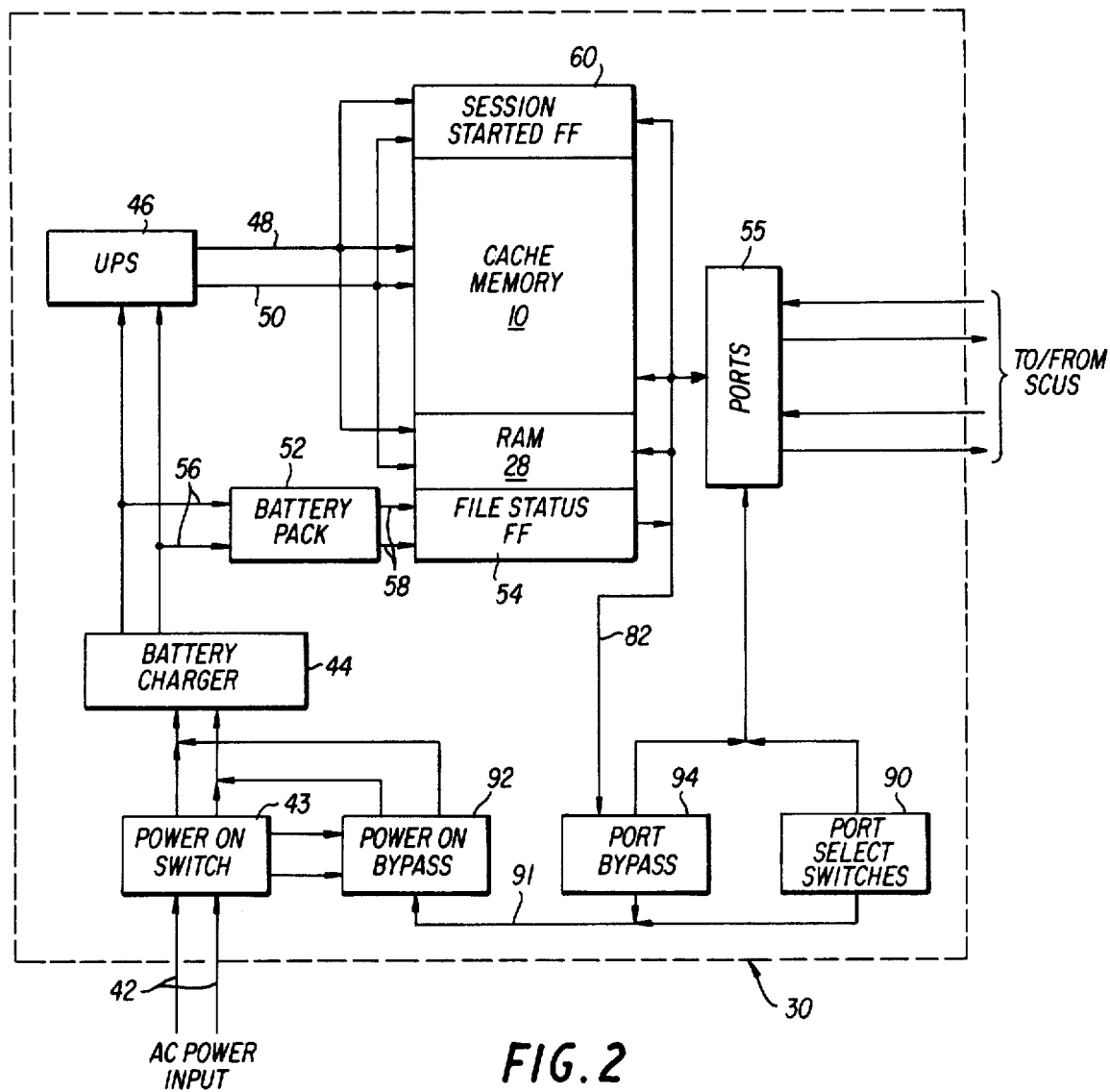
FIG. 2 schematically illustrates the power supplies provided in a cache memory cabinet and certain switches which may be rendered inoperative when a file status signal indicates that written-to segments are present in the cache memory; and, FIG. 3 is a logical circuit diagram illustrating the manner in which a signal may be generated to indicate that a file of data is good or a written-to segment is present in a cache memory.

The cache memory is made up of MOSFET devices. Since there may be a delay between the time data from a host is written into the cache memory and the time this data is subsequently written to one of the disk drive devices 12, means are provided for preserving data in the cache memory for a limited interval of time in the event of a power failure. As illustrated in FIG. 2, the cache memory cabinet 30 receives AC input power from the power mains over a pair of leads 42 which are connected through an ON-OFF switch 43 to a battery charger 44. The battery charger 44 keeps a battery in a 5 volt uninterruptable power supply 46 fully charged as long as the AC power is maintained. The uninterruptable power supply (UPS) 46 is designed such that it will provide sufficient power for a limited time, say 15 minutes, after interruption of the AC input power, to maintain and operate the cache memory portion 10 and the RAM 28. For this purpose the output of UPS 46 is connected by way of leads 48 and 50 to the RAM 28 and the cache memory portion 10. A battery charger 44 and a UPS 46 is provided in each of the cache memory cabinets 30, 32, 34 and 36.

Since the UPS 46 has a life of approximately 15 minutes, and since it is impractical to provide a UPS having a much longer life, some means must be provided for maintaining over a longer interval of time an indication of whether the data files, that is, the data in the cache memory and on the disk, is accurate and up to date. This can create a problem where, for example, the AC input power is terminated for an interval of time greater than the life of the UPS 46. In accordance with the principles of the present invention this problem is overcome by providing a separate battery pack 52 and a File Status flipflop 54 in the cache memory cabinet which houses the RAM 28. The battery charger 44 is connected by leads 56 to maintain the batteries in the battery pack 52 fully charged as long as the AC input power is on. The output of the battery pack 52 is connected by leads 58 to the File Status flipflop 54. Since the battery pack 52 powers only the File Status flipflop 54, it may have a considerably longer life (for example 5 days) after termination of the AC input power as compared to the life of UPS 46.

A battery pack 52 and File Status flipflop 54 may be provided in the cache memory cabinets 32, 34 and 36 but according to the present invention only one is utilized and it is preferable to sense the status of the flipflop 54 in the cabinet housing the active RAM 28.

In FIG. 2, the File Status flipflop is shown adjacent to the RAM 28 to indicate that the File Status flipflop is in essence treated as being another addressable RAM location. That is, a command from a host processor may be applied to a storage control unit which then processes the command and sends an address over a bus to the port control circuits 55. From the port control circuits the address is applied to addressing circuits as shown in application Ser. No. 207,152 to address the RAM (or flipflop 54) to read out a word from the RAM (or the state of flipflop 54).

Figure 3:
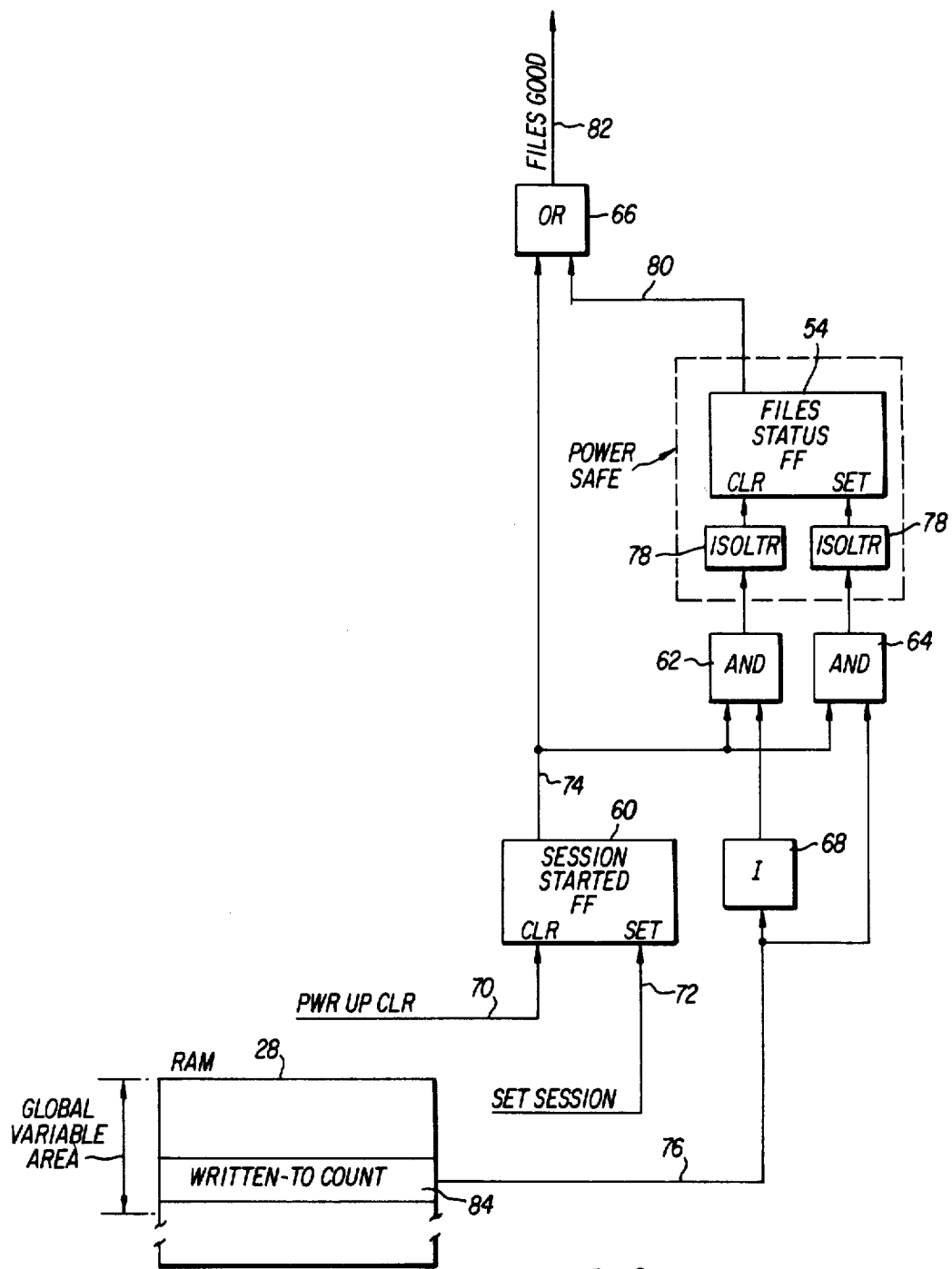

FIG. 3 shows the File Status flipflop 54 connected in a circuit which includes a Session Started flipflop 60, two AND gates 62 and 64, an OR gate 66 and an inverter 68.

The Session Started flipflop is cleared by a Power Up Clear or Reset Session signal on a lead 70 at the start of each computing session as subsequently described. The Session Started flipflop is set by a Set Session signal on a lead 72 and when the flipflop is set it produces a true (high level) output signal on a lead 74. This signal passes through OR gate 66 to become the signal Files Good on lead 82. In addition, the lead 74 is connected to one input of the two AND gates 62 and 64. A lead 76 has a true high level signal applied thereto when the written-to count stored in the RAM 28 has a zero value. A high level signal on lead 76 enables a second input of AND 64 and acts through inverter 68 to block AND 62. On the other hand, if the written-to count is not zero then the false signal on lead 76 is inverted by inverter 68 to enable AND 62 while the signal on lead 76 blocks AND 64.

The outputs of ANDs 62 and 64 are applied through power isolator circuits 78 to the clear and set inputs, respectively, of the File Status flipflop 54. When the File Status flipflop is set it produces an output signal on lead 80 which passes through OR 66 to become the File Good signal on lead 82.

The circuit of FIG. 3 operates as follows. When a data processing session is to begin one of the host processors 16 or 20 issues an Initialize command to one of the storage control units 14 or 18 to initialize certain parameters or variables used in the cache/disk system. The Initialize command is decoded in a storage control unit in the manner explained in copending application Ser. No. 207,152. The storage control unit controls the initializing operations and as one step thereof calls a Set File Indicators subroutine which first sends a zero value to RAM 28 to clear the location 84 therein which stores a count of the number of written-to segments in all portions of the cache memory. This produces a signal on lead 76. A circuit for doing this is not shown herein but merely comprises a decoder for decoding an address held in the cache memory address register and a further decoder for sensing when a zero value is held in the cache memory data register, these registers being shown in application Ser. No. 207,152. When the address decoder senses that the address in the address register is the address in RAM 28 which stores the count of written-to segments it produces an output signal to enable the further decoder which then produces a high level signal on lead 76 only if the value in the data register is zero.

After the written-to count is zeroed, the Set File Indicators subroutine causes the storage control unit to send to the Session Started flipflop 60 two signals to toggle the flipflop. The first signal is a Reset Session signal which appears on lead 70 to reset the flipflop. The second signal is a Set Session signal which sets the flipflop. A set File Indicators subroutine suitable for use with the system disclosed in application Ser. No. 207,152 is appended to this specification.

When the Session Started flipflop is set it enables AND gates 62 and 64 and applies a signal to OR gate 66 to produce the Files Good signal on lead 82. As various data processing operations take place during the session different values are loaded into the particular location 84 in RAM 28 depending upon the number of written-to segments resident in the cache memory at any given time. Thus, during a data processing session a high level signal may appear on lead 76 whenever the value in location 84 is zero and a low level signal may appear on lead 76 when location 84 indicates that there is at least one segment in the cache memory that has been written to but not destaged to a disk drive device.

The signal on lead 76 enables one or the other of the two AND gates 62 and 64 thereby enabling the setting and clearing of the File Status flipflop 54 as the session continues. The File Status flipflop produces a high level output signal through OR 66 to become a Files Good signal on lead 82 when the flipflop is set.

Assume now that the AC power to the cabinet fails for an interval of time in excess of the life of UPS 46. The data in any written-to segments is lost, as is all data in the cache memory. However, the battery pack 52 (FIG. 2) maintains the File Status flipflop 54 in the same state that it had at the time the power failed. As previously indicated, this may be for a period of up to five days.

When power is restored to the cabinet 30 the output from OR gate 66 will be high or low depending on whether the File Status flipflop 54 was set or reset at the time all power failed. If the flipflop was set then OR 66 produces the Files Good signal on lead 82; otherwise it does not. One of the host processors may now issue a Read Utility command having a subcommand field specifying that file status should be read. Command formats are illustrated in application Ser. No. 207,152. The Read Utility command is applied to one of the storage control units 14 and 18 which decodes the command and establishes communication with the cabinet 30. The Files Good signal on lead 82 is read and transferred through the active storage control unit to the host that issued the command to read the status of the file. Thus, if there were any written-to segments in cache memory that had not been destaged at the time of power loss the File Status flipflop will be clear and the Files Good signal on lead 82 will be false thereby indicating that some data was lost during the power outage. On the other hand, if there were no written-to segments in the cache memory at the time power failed the File Status flipflop will be set to cause OR 66 to produce a true Files Good signal on lead 82 thereby indicating to the host processor that no data was lost during the power outage. A routine suitable for use in the system disclosed in application Ser. No. 207,152 to read the file status is appended to this specification.

After the File Status flipflop has been read, and appropriate action taken depending upon its state, the host processor may issue an Initialize command to again set the Session Started flipflop 60.

According to one aspect of the present invention the Files Good signal may be utilized to prevent the cabinet containing the RAM from being manually placed off-line when there are written-to segments resident in the cache memory. In FIG. 2, a plurality of port select switches 90 are provided for disabling a corresponding plurality of ports 55. As each switch is turned off it disables transmissions in or out of the cache cabinet through its corresponding port to or from one of the storage control units 14 or 18. These switches, by way of a connection 91 control a bypass circuit 92 around the power-on switch 43 so that power is not cut off when switch 43 is turned off unless the port select switches 90 are also off. In accordance with the present invention the Files Good signal on lead 82 is applied to a port switch bypass circuit 94 so that operation of these switches will have no effect at all when the bypass circuit 94 is operative. The Files Good signal on lead 82 activates the bypass circuit 94 when there are any written-to segments in the cache memory. Therefore, when there are written-to segments in the cache memory the cabinet 30 cannot be taken off-line by opening the port select switches 90 or turning off the power-on switch 43. This prevents the cabinet containing the RAM from being taken off-line and offers a measure of data protection. Although the other cabinets may still be taken off line, the RAM contains the global variables and if data is lost by taking one of the other cabinets off line with written-to segments in its cache memory portion, this loss of data will be detected by other various system checks.

While a preferred embodiment of the invention has been described in specific detail, it will be understood by those skilled in the art that various substitutions and modifications may be made in the embodiment shown without departing from the spirit and scope of the invention as defined by the appended claims.

The embodiments of the invention in which an exclusive property or privilege is claimed are defined as follows:

1. In a system having a processor, a cache memory for storing segments of data, an addressable memory, a bulk memory, a storage control unit for controlling transfers of segments of data between said cache memory, said processor and said bulk memory, said storage control unit including means for developing a count of the number of segments of data in said cache memory which have not been destaged to said bulk memory since being written to and storing said count in said addressable memory, and a memory power supply for powering said cache memory and said addressable memory, the improvement comprising:

a standby power supply;

first and second flipflops, said first flipflop being powered from said memory power supply and said second flipflop being powered by said standby power supply in the event of termination of said memory power supply;

sensing means for sensing said count in said addressable memory and producing a first signal indicating whether or not said count is zero;

means in said storage control unit responsive to a command from said processor for setting said first flipflop at the beginning of a computing session, said first flipflop producing a second signal when it is set;

first means responsive to said first signal and said second signal for setting said second flipflop when said first flipflop is set and said first signal indicates said count is zero;

second means responsive to said first and second signals for resetting said second flipflop when said first flipflop is set and said first signal indicates said count is not zero; and, means responsive to said first flipflop and said second flipflop for producing a good files signal when either said first or said second flipflop is set whereby said good files signal is produced during a computing session as long as said memory power supply supplies output power, and said good files signal is produced after said memory power supply ceases supplying output power if said second flipflop is set at the time said memory power supply ceases supplying output power.

2. The improvement as claimed in claim 1 and further comprising means responsive to a given command from said processor for reading said good files signal and transferring it to said processor.

3. The improvement as claimed in claim 2 wherein said means for setting said first flipflop comprises means responsive to a second given command from said processor.

4. In a system having a cache memory for storing segments of data, a bulk memory, an addressable memory means and a storage control unit for controlling the transfer of segments of data between said cache memory and said bulk memory, said storage control unit including means for developing a count of the number of written-to segments in said cache memory which have not been destaged from said cache memory to said bulk memory since being written to and storing said count in said addressable memory means, the improvement comprising:

a main power supply for supplying power to said cache memory and said addressable memory means;

a standby power supply;

first means powered by said main power supply and settable at the beginning of a computing session for producing a first output signal for the duration of a computing session or until there is a loss of power from said main power supply;

a file status indicator means powered by said standby power supply and having a set state and a reset state, said file status indicator means producing a second signal as long as it is set;

sensing means for sensing said count in said addressable memory means;

gating means responsive to said sensing means for selectively setting said file status indicator means when said count is zero and resetting it when said count is not zero;

said gating means being connected to said first means and enabled by said first signal; and, means responsive to said second signal for producing a good files indicator signal upon occurrence of said second signal whereby said good files indicator signal provides an indication, subsequent to a loss of power from said main power supply, as to whether or not any data was lost because of said loss of power.

5. A system as claimed in claim 4 and further comprising a processor having means for issuing a given command after said loss of power ceases, and means responsive to said given command for transferring said good files signal to said processor.

6. A system as claimed in claim 5 wherein said processor includes means producing a second given command to set said first means.

7. In a system having a cache memory for storing segments of data, an addressable memory, a bulk memory, and a storage control unit for controlling transfers of data between said cache memory and said bulk memory, said storage control unit including means for developing a count of the number of written-to segments in said cache memory that have not been destaged to said bulk memory and storing said count in said addressable memory, and a main power supply for supplying power to said cache memory and said addressable memory, the improvement comprising:

- a file status indicator comprising a flipflop having two states and producing a file status output signal when it is set;
- means for sensing said count;
- means responsive to said sensing means for selectively setting said file status indicator when said count is zero and resetting it when said count is not zero;
- selectively operable switch means for taking said cache memory off line; and
- bypass means responsive to said file status output signal for bypassing said switch means when said file status signal indicates that written-to segments are present in said cache memory,
- whereby said switch means is rendered inoperable when written-to segments are present in said cache memory.

8. The improvement as claimed in claim 7 wherein port means are connected between said cache memory and said storage control unit, and said switch means includes port select switch means for selectively controlling said port means to selectively inhibit the transfer of data therethrough between said storage control unit and said cache memory, whereby said port select switch means is bypassed when said file status indicator is reset.

9. The improvement as claimed in claim 7 and further including:

- a source of power;
- said switch means including a power switch connected between said source of power and said cache memory for selectively disconnecting said source of power from said cache memory,
- whereby said power switch is rendered inoperable to disconnect said source of power from said cache memory when said file status indicator is reset.

10. The improvement as claimed in claim 9 and further comprising a standby power supply for said file status indicator for maintaining the state of said file status indicator for a considerable period of time in the event there is a loss of power from said source of power.

* * * * *